US008285571B2

(12) United States Patent
Demirdjian et al.

(10) Patent No.: US 8,285,571 B2
(45) Date of Patent: Oct. 9, 2012

(54) RIDESHARE SYSTEM AND ASSOCIATED METHODOLOGY

(75) Inventors: David Demirdjian, Somerville, MA (US); Steven F. Kalik, Arlington, MA (US)

(73) Assignee: Toyota Motor Engineering & Manufacturing North America (Tema), Erlanger, KY (US)

( * ) Notice: Subject to any disclaimer, the term of this patent is extended or adjusted under 35 U.S.C. 154(b) by 151 days.

(21) Appl. No.: 12/388,242

(22) Filed: Feb. 18, 2009

(65) Prior Publication Data
US 2010/0207812 A1 Aug. 19, 2010

(51) Int. Cl.
*G06Q 50/30* (2012.01)
*G06Q 99/00* (2006.01)

(52) U.S. Cl. ............................................ 705/6; 705/319
(58) Field of Classification Search ................ 705/6, 319
See application file for complete search history.

(56) References Cited

U.S. PATENT DOCUMENTS

| | | | |
|---|---|---|---|
| 6,925,381 B2 | 8/2005 | Adamczyk | |
| 7,062,376 B2 | 6/2006 | Oesterling | |
| 7,080,019 B1 | 7/2006 | Hurzeler | |
| 2003/0025720 A1* | 2/2003 | Lau et al. | 345/700 |
| 2003/0046304 A1* | 3/2003 | Peskin et al. | 707/104.1 |
| 2004/0049424 A1 | 3/2004 | Murray et al. | |
| 2005/0131716 A1* | 6/2005 | Hanan et al. | 705/1 |
| 2006/0106636 A1* | 5/2006 | Segal | 705/1 |
| 2006/0276960 A1* | 12/2006 | Adamczyk et al. | 701/201 |
| 2007/0276595 A1 | 11/2007 | Lewinson et al. | |
| 2007/0282661 A1 | 12/2007 | Franco | |
| 2008/0021756 A1* | 1/2008 | Kesavan | 705/8 |
| 2008/0040232 A1* | 2/2008 | Perchthaler | 705/26 |
| 2008/0091342 A1* | 4/2008 | Assael | 701/202 |
| 2008/0167892 A1 | 7/2008 | Clark et al. | |
| 2008/0195428 A1* | 8/2008 | O'Sullivan | 705/6 |
| 2009/0157613 A1* | 6/2009 | Strohmenger et al. | 707/3 |
| 2009/0216600 A1* | 8/2009 | Hill | 705/9 |
| 2009/0248587 A1* | 10/2009 | Van Buskirk | 705/80 |

FOREIGN PATENT DOCUMENTS

JP 2003-331013 11/2003
JP 2005-018697 1/2005

* cited by examiner

*Primary Examiner* — Kevin Flynn
(74) *Attorney, Agent, or Firm* — Oblon, Spivak, McClelland, Maier & Neustadt, L.L.P.

(57) ABSTRACT

A rideshare system and associated methodology for recommending rideshares to prospective riders and drivers uses itineraries and personal affinities to make the recommendations. The rideshare system computes a cost value by comparing the search criteria submitted by a user to stored user profiles. Results of the comparison are displayed in order of highest match to lowest match, according to the cost values computed. Further, the system also adaptively updates the stored profiles according to rideshare history. Lastly, the system includes a real-time user localization unit to locate prospective riders and drivers in real time, making just in time or unplanned rideshares possible.

29 Claims, 7 Drawing Sheets

RIDESHARE SYSTEM AND ASSOCIATED METHODOLOGY

BACKGROUND OF THE INVENTION

1. Field of the Invention

The present invention relates to a rideshare system and associated methodology. More specifically, the present invention relates to a rideshare system that matches a driver with a rider based on matching itineraries and personal affinities.

2. Discussion of the Related Art

In recent years congestion on the nation's roadways has dramatically increased as more and more cars vie for space on the road. As a result, travel by car has become increasingly more difficult, and even short-distance commutes may be very time-consuming. Further, the rate of increase of traffic volume outpaces governmental efforts to maintain and expand roadways, making traffic jams commonplace, particularly in urban areas.

There is also increasing evidence that burning fossil fuels, such as when driving a car, emits gases that pollute the atmosphere, may contribute to respiratory illnesses, and may also contribute to global warming. While evolving car technologies produce ever more fuel efficient and cleaner-running cars, the pace of such innovation is outweighed by the sheer number of vehicles taking to the roads each year.

Additionally, recent demand for oil has driven gasoline prices higher, which, in turn, increases the cost of driving a car or any other vehicle which depends on oil or an oil derivative for fuel. Traffic congestion, where a car is likely to burn fuel while making little or no progress, only exacerbates the cost of driving.

The above-noted factors have led to an interest in finding new modes of transportation that either use alternate fuels, better use existing fuels, or simply transport people more efficiently. Among these modes is ridesharing. Ridesharing involves a group of people commuting from a departure point to a destination in a single vehicle. Thus, the number of cars on the road may be reduced in proportion to the number of people willing to be passengers (or "riders") in a rideshare, thereby also reducing the amount of fuel burned and exhaust emitted.

For example, one conventional way of ridesharing is by riding a public bus. Though a bus may consume more fuel than a car, it also transports many more people, making it a very efficient mode of transportation. However, ridesharing on a bus is very restrictive insofar as all of the departure/arrival locations and times are predetermined along a rigid route. Thus, a bus rider must adjust his or her schedule to the bus's schedule, and must frequently walk or use another form of transportation to arrive at his or her final destination since bus stops rarely coincide with a traveler's final destination.

Another conventional way of ridesharing is carpooling. For example, co-workers may take turns driving to and from work in their respective private cars. This way, each individual car travels less, saving on cost of fuel, maintenance, emissions, etc.

However, like riding a public bus, carpooling can be rigid. Carpooling requires advance planning of the departure time, departure location, destination, etc., and therefore may only be suitable for repetitive trips, such as driving to work, school, and the like. Therefore, carpooling may only be an attractive option for co-workers, family members, students attending a same school or class, and the like. It is unlikely that two completely unrelated people (i.e. strangers) would even know of each other's willingness to carpool, much less coincide in destination, departure/arrival times, etc. Therefore, carpooling among strangers is uncommon.

With the advent of the internet, carpooling has been made more efficient by carpooling sites such as ride-share.pickuppal.com, erideshare.com, rideshareonline.com, or dividetheride.com. These sites allow users to post advertisements seeking either drivers or riders in a quasi-public forum in order to find a match. Once a rideshare is identified, these sites merely provide the prospective participants with the contact information of other participants. Conventionally, these sites do not take part in negotiating the rideshare (i.e. determining who will participate and who will not) nor in making the final arrangements. Further, many of these conventional rideshare sites lack a way of keeping user information private until a rideshare is accepted, and then providing the user information only to those users that accept the rideshare.

Moreover, conventional sites provide itinerary information, but no personal affinity information. Because rideshare websites are quasi-public forums visited by thousands, if not millions of users, it is unlikely that candidates to a possible rideshare will know each other. As these sites offer only itinerary information, a user must choose rideshare companions solely on itinerary, and without knowing if he or she is compatible with the other rideshare participants in other ways. Thus, ridesharing in this way may lead to boring, unpleasant, or even dangerous situations, and may dissuade at least some people from sharing rides.

Conventional systems also lack a way of determining the current position (location) of their members. As such, ridesharing through conventional websites and systems may still require advance planning as the only itinerary information available for their respective members is the one pre-entered by the users themselves. For example, if a driver has an itinerary that is fifty miles from a rider, that rider may not consider ridesharing with the driver even though the driver may only be one mile away from the rider at the time that the rider is searching for a ride. Therefore, conventional systems and websites lack the ability to create a real-time (or "just in time") rideshare.

Furthermore, as demand for fossil fuels increases, and fossil fuel stores become depleted, governments may want to provide incentives to encourage citizens to seek other means of transportation besides driving their own cars. For example, a "cap and trade" system may be employed wherein each citizen is allotted a fixed number of driving credits, and may trade the credits with other citizens by forming rideshares. Current ridesharing websites and ridesharing systems are not equipped to track such a system.

SUMMARY

The present invention seeks to solve at least the above-noted problems through a method of recommending a rideshare that generates a search criteria according to user-defined inputs including at least one itinerary and at least one personal affinity category. The method includes generating a cost value for each of a plurality of stored user profiles, which are stored in a computer-readable medium, according to the search criteria. Each of the user profiles stored in the computer-readable medium includes at least one itinerary and at least one personal affinity category. Once the cost values are determined for all of the user profiles, at least one of the stored user profiles is anonymously displayed along with its corresponding cost value. A first anonymous message is transmitted to a communication address corresponding to a selected user profile. The message includes a request to form a rideshare. A second anonymous message is received from the communication address corresponding to the selected user profile, indicating whether the rideshare is accepted or rejected. Either the contact information associated with the selected user profile or an anonymous denial message is displayed depending upon whether the rideshare was rejected or accepted.

The method also involves weighting the itinerary and personal affinity categories used to generate the cost value according to a plurality of user-defined priorities.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The present invention describes a preferred embodiment of the invention by referring to the accompanying drawings, wherein like features are referred to by the same reference designator.

Figure 1:
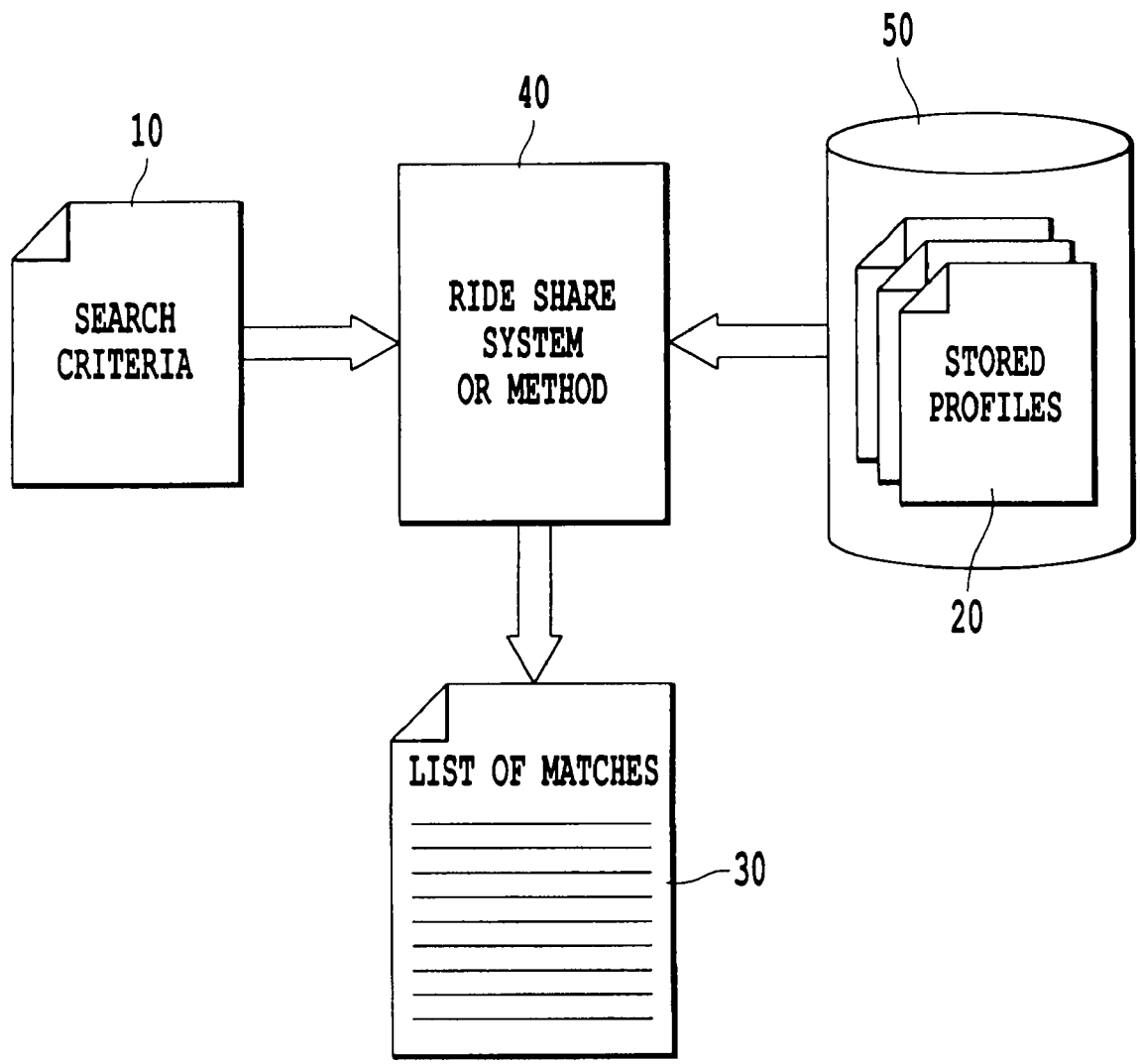
FIG. 1 is a schematic drawing of the rideshare method according to an exemplary embodiment of the present invention.

FIG. 1 is a schematic diagram of the overall ridesharing recommendation method according to an exemplary embodiment of the present invention. In FIG. 1, a search criteria 10 is generated by a user seeking a rideshare, and is transmitted to a rideshare system 40 on which the method of the present invention is implemented. Then the rideshare system 40 calculates a cost value for each personal profile 20 stored an the electronic storage medium 50. Based on the calculated cost values, the rideshare system 40 generates a list of matches 30 including profiles 20 that match the search criteria 10. The list of matches 30 also includes the cost values that correspond to the profiles contained therein.

As used herein, a cost value includes a measure of similarity between the search criteria 10 and the stored profiles 20 or also a measure of the difference between the search criteria 10 and the stored profiles 20. For example, if used as a measure of similarity, a high cost value may indicate a high degree of similarity and a low degree of difference. Conversely, if the cost value is a measure of difference, a high cost value may indicate a high level of difference and a low level of similarity. However, the above are only two exemplary ways of defining the cost value, and others are possible as can be appreciated by one skilled in the art. For example, the cost value may be an absolute measure or a relative measure, relative to some minimum or maximum value. Further, the cost value is not limited to integers and/or positive numbers, but may be any number within the real number system, such as a negative number, a fractional number, and the like.

The list of matches 30 may also be arranged in multiple ways without departing from the scope of this advancement. For example, the list of matches may be arranged in order of ascending cost values, or may be arranged in order of descending cost values. The list of matches 30 may also be arranged alphabetically, in order of departure time, in order of departure point, in order of destination, in order of profile rating (as described below) or in any other way known in the art. Additionally, the user may define his or her own preferred arrangement for the list of matches 30.

Figure 2:
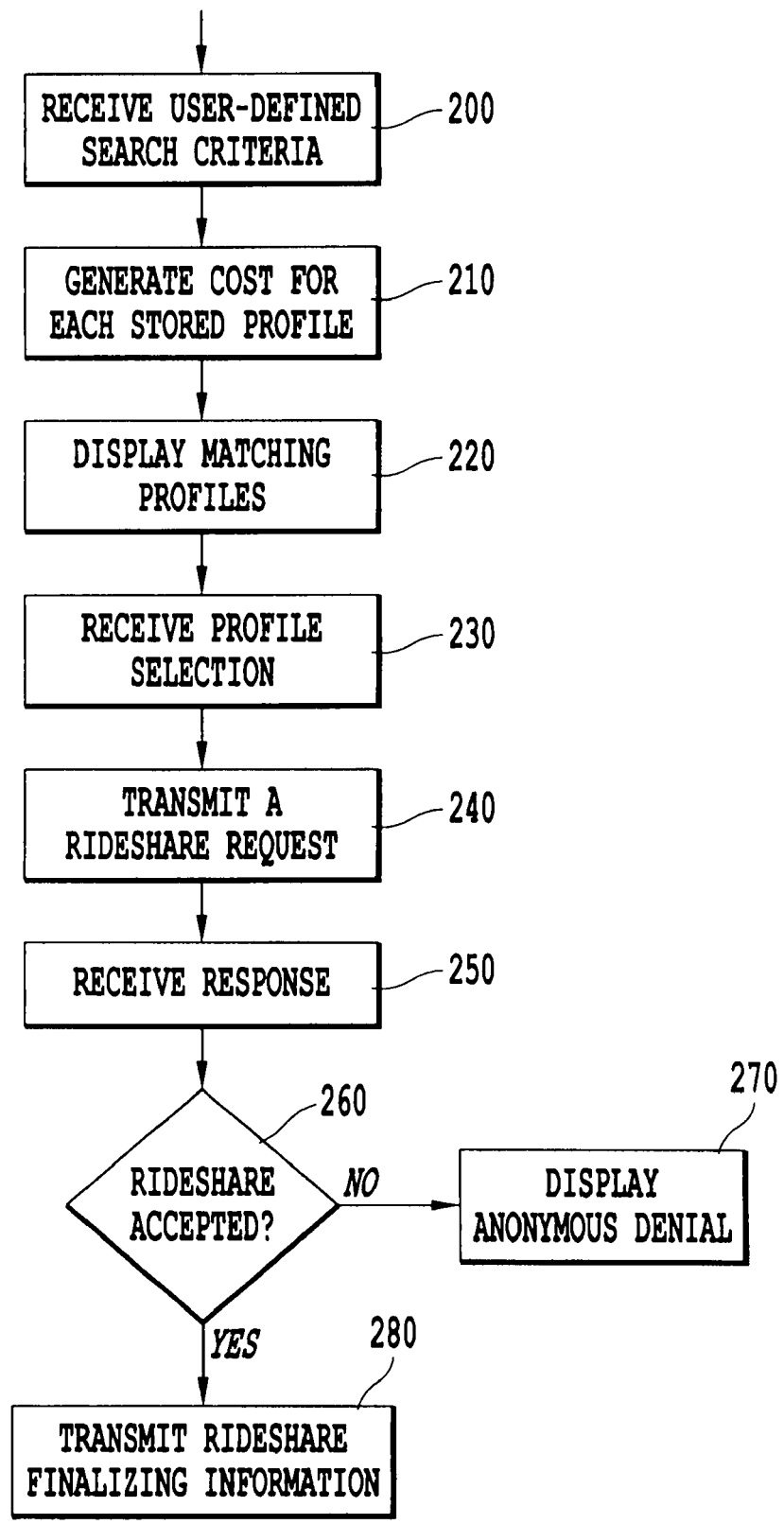
FIG. 2 is a flowchart of the rideshare method according to the exemplary embodiment of the present invention.

FIG. 2 is a flowchart of the rideshare recommendation method according to an exemplary embodiment of the present invention. At step 200 the user seeking a rideshare enters a search criteria 10. The user may be a driver willing to take on one or more riders, or may be a rider seeking to ride along with a driver. At step 210, a cost is generated for each of the stored profiles 20 stored in the electronic storage medium 50. After cost values are generated for each stored profile, matching profiles are displayed to the user, along with their corresponding cost values, at step 220, as described above.

In this context a matching profile may be a profile that has a cost value below a predetermined threshold, or may be a predetermined number of profiles having the lowest cost values. For example, in the case where the predetermined threshold is set to fifty, then any profile whose cost value is below fifty is a "matching profile" and will be displayed to the user. Alternatively, if no predetermined threshold is used, the method may display five profiles having the lowest cost values. As can be appreciated by those skilled in the art, these two cases are merely illustrative, and other forms of determining matching profiles are possible without departing from the scope of the present advancement.

Further, the method may also allow the user to determine whether a threshold will be used, and to determine the value of the predetermined threshold. In the event that a threshold is used, the system may optionally inform the user that no matches exist if no profiles meet the threshold requirement. The user may then relax the threshold requirement until a match is found.

Once the user selects from the profiles in the list of matches 30, the selection is received at step 230. Then an anonymous message soliciting a rideshare is sent according to the contact information associated with the selected profile at step 240. However, the contact information is not revealed to the user at this time, and anonymity between users is preserved. Also, the contact information may include, without limitation, an e-mail address, a phone number, an instant messaging address or any other address known in the art.

Additionally, in this context, an anonymous message may include a message written by the user that has been stripped of all identifying information, a predetermined message, or any other way of communicating a rideshare solicitation, such as an audible signal, a visual, and the like.

At step 250, a response to the anonymous message is received, and at step 260 it is determined whether the rideshare is accepted or rejected. If the rideshare is accepted, then a rideshare finalizing information is transmitted to both parties (i.e. the user and the person corresponding to the selected profile) at step 280. For example, rideshare finalizing information may include contact information for one or both parties so that the parties may independently finalize the rideshare (i.e. determine a meeting time and location). The rideshare finalizing information may also include a predetermined meeting location and time chosen by the system. The rideshare finalizing information may also include car make and model, personal appearance descriptions, proposed routes, and/or any other such information known in the art.

Alternatively, if the rideshare is rejected, an anonymous denial message is communicated to the user at step 270, thus preserving anonymity. The anonymous denial message may take any of the forms described in reference to the anonymous solicitation message, or any other form known in the art.

As first recognized by the present inventors, maintaining anonymity among the users until a rideshare is accepted allows users to more precisely select rideshare matches without fear of offending others or being retaliated against by other users. In other words, preserving anonymity makes rideshare selection a more objective process.

Once the rideshare has been accepted by both parties, and the rideshare finalizing information includes contact information for both parties, the parties may contact each other to make final arrangements for the rideshare. Though in this case final arrangements are made by direct contact between the parties to a rideshare, as first recognized by the present inventors, determining matches according to both itineraries and personal affinities has the benefit of more precisely matching the parties, and therefore increasing the chances that the rideshare will be successful and enjoyable. This, in turn, increases the chances that the parties to the rideshare will want to take part in future rideshares.

Figure 3:
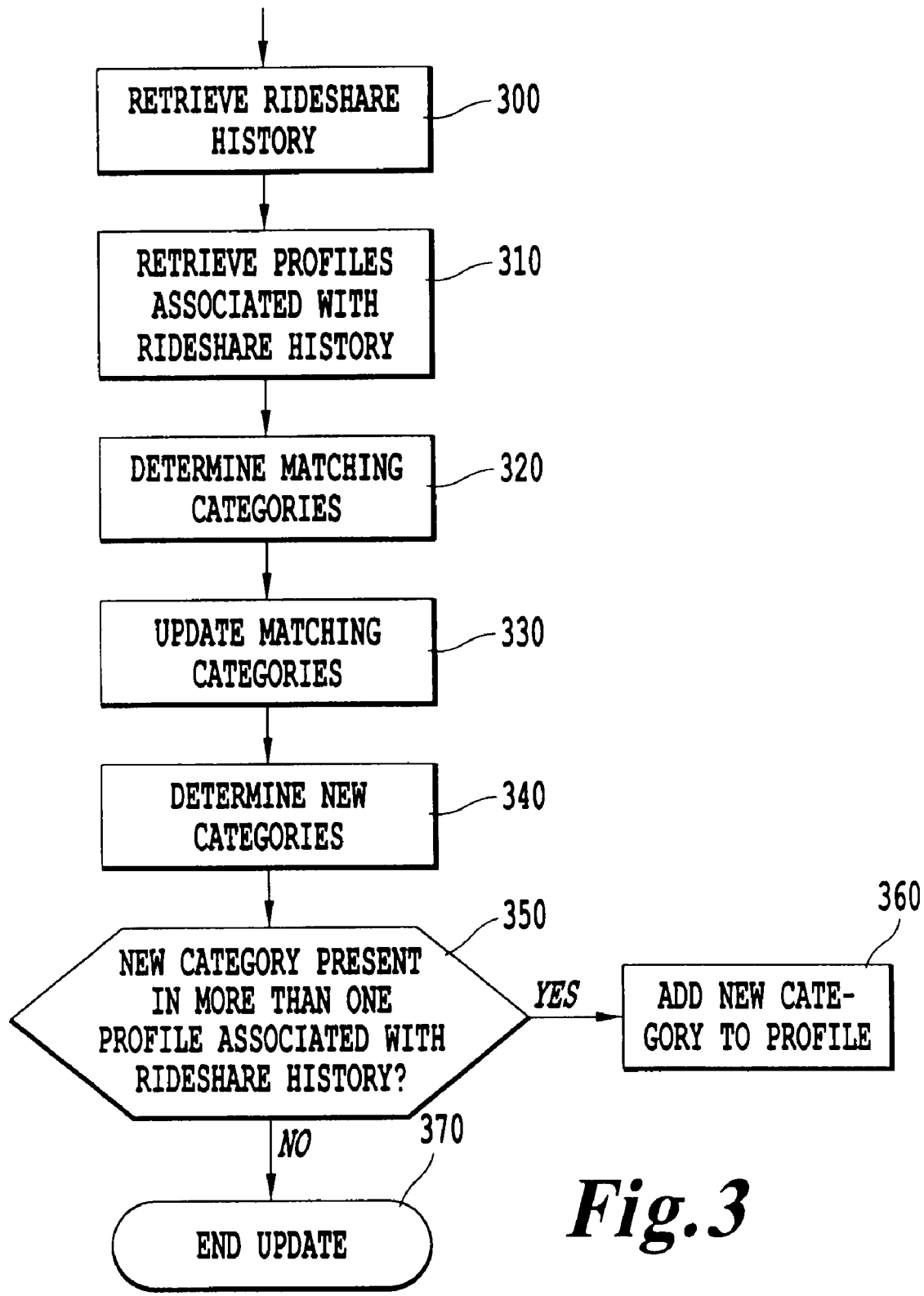
FIG. 3 is a flowchart of profile update according to an exemplary embodiment of the present invention.

FIG. 3 is a flowchart of a profile update according to an exemplary embodiment of the present invention. To update a profile, first a history of rideshares associated with the profile is retrieved at step 300. The history of rideshare is then searched to identify other profiles also associated with the rideshares contained therein at step 310. For example, if rider A has shared a ride with driver B in the past, the history of rideshares will reflect this, and the profile of driver B will be identified at step 310.

At step 320 matching categories between the profile to be updated and the profiles identified in step 310 are identified. For example, and in no way limiting the scope of this disclosure, profiles may have such categories as Washington, D.C. area routes, movies, sports, smoking/non-smoking, recently read books, and the like. Once a matching category is identified, the matching category of the profile to be updated is updated with the values in the identified profile at step 320. For example, if a profile to be updated has a category labeled "movie genres" and an identified profile also has a category labeled "movie genres", the movie genre category of the profile to be updated will be modified according to the movie genre category of the identified profile. Such modification of a matching category can include, for example, storing the union of both matching categories in the profile to be updated, storing the intersection of both matching categories in the profile to be updated, or any other means of combining related sets known in the art.

At step 340, categories not currently associated with the profile to be updated, but associated with the identified profiles are determined. Then at step 350 it is determined whether the new categories identified at step 340 should be appended to the profile to be updated. For example, in one embodiment all new categories (i.e., categories not currently part of the profile to be updated) may be appended to the profile to be updated. In another embodiment, a new category is only appended to the profile to be updated if the new category is identified with more than a predetermined number of identified profiles. For example, a new "movie genre" category may be added to the profile to be updated only if the user has shared rides with more than seven people who have "movie genre" as a category in their profile. As can be appreciated by a person skilled in the art, the above example is illustrative, and therefore not limiting of this disclosure, as other ways of appending a new category to a profile are possible without departing from the scope of this disclosure.

Once it is determined that a new category is to be added to the profile to be updated, the new category is added at step 360, and the process of updating the profile ends at step 370.

Though not shown in FIG. 3, for the sake of brevity, additional steps may be included to determine whether an existing category in a profile should be deleted from the profile, should be merged with another broader or narrower profile category, should be split into two separate categories, or the like.

Further, a profile may also be manually generated by a user, or may be imported from another system that employs profiles, such as Facebook, MySpace. The user may also enter a minimum amount of data into his or her profile and allow the above-described process to generate the profile over time. Also, the user may import and modify an existing profile. Moreover, a user is not limited to a single profile, but may have multiple profiles.

Figure 4:
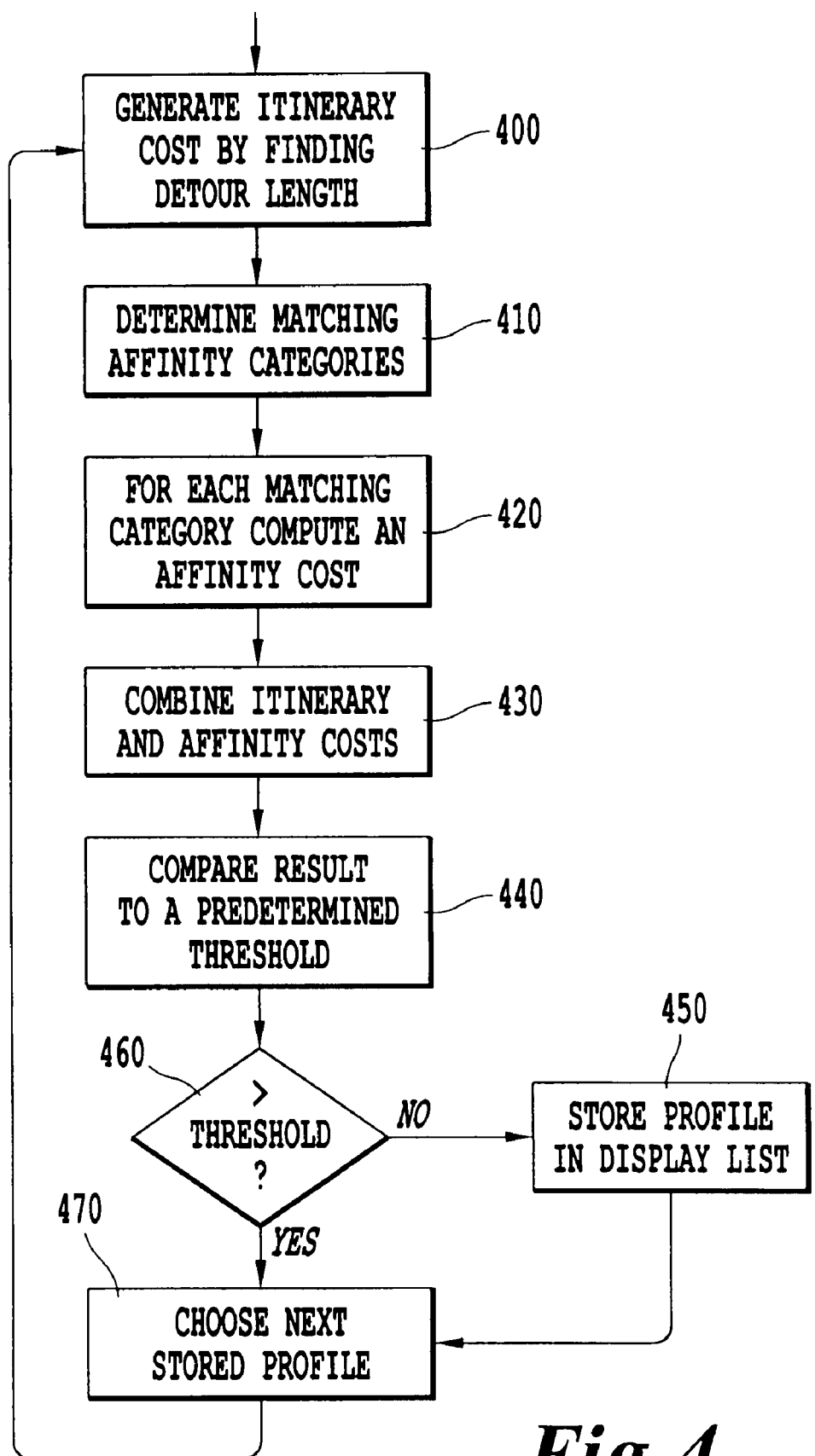
FIG. 4 is a flowchart of cost value generation according to an exemplary embodiment of the present invention.

Next, generating the cost value will be described with reference to FIG. 4. At step 400, an itinerary cost value is generated according to a detour length of the detour a driver may take to pick up a prospective rider. As used herein, a detour length is any of (i) the absolute distance corresponding to a route taken by a driver to rendezvous with a prospective rider, (ii) a relative value corresponding to the difference between an optimal route associated with a driver's itinerary and the route the driver will take in order to rendezvous with a prospective rider, (iii) an absolute time or duration corresponding to a route that the driver will take to rendezvous with a prospective rider, (iv) a relative time corresponding to the time difference between the duration of an optimal route associated with the driver's itinerary and the route the driver will take to rendezvous with a prospective rider, or (v) any other measurement used to measure trips, distances, routes, etc., as known in the art.

Moreover, when the detour length is given as a relative distance, the relative distance may be given in terms of a differential distance. For example, the detour may be given as being five miles greater than an optimal route, or five miles less than an optimal route, or the detour length may be given as a percentage (i.e., 10% of the trip distance). Similarly, when the detour length is given in time, the detour length may be given in terms of absolute time (i.e., an additional ten minutes) or may be given in terms of percentages (i.e., an additional 10%).

The detour length may be the itinerary cost value, or may be further used to determine the itinerary cost value through additional processing. For example, the detour length may be processed using a function such as an absolute value function, a logarithmic function, an exponential function, or a weighting function, and the like. Further, the detour lengths of multiple itineraries or multiple routes associated with a single itinerary may be combined through, for example, a weighted average.

At step 410, matching personal affinity categories between the search criteria 10 and a stored profile 20 are identified, and personal affinity cost values are computed for each matching category at step 420. When the data contained in the matching categories is numeric data, the associated personal affinity cost value may be directly computed through functions such as an averaging function, a weighted averaging function, a difference function, a sum function, and any other function known in the art.

However, when the categories contain data other than numeric data, for example, a category labeled "movie genres" may contain such data as "horror movies," "comedies," "romance", and the like, a ranking system is established to numerically rank the data values contained therein. For example, a ranking system may be used wherein horror movies are assigned a value of one, romance movies are assigned a value of 100, and other genres, such as comedies, westerns, military, documentaries, etc., are assigned intermediate values between 1 and 100. In this case, the personal affinity cost value is computed in accordance with the rank associated with a given value using any of the function described above. The ranking system is not limited to numbers between 1 and 100, and can by established using any number system. Therefore, the ranking system may include negative numbers, positive number, fractional numbers, and may have a scale that is linear, logarithmic, exponential, and the like. The ranking system may also be established relative to a predetermined maximum or minimum, or the maximum and minimum values may be user-defined.

Alternatively, each category, or a subcategory thereof, may define a dimension in an n-dimensional profile space. Each profile may then be represented as a location in the n-dimensional space given by coordinates that correspond to the data stored in the profile. As such, the distance between two or more profiles may be computed using vector mathematics, and a matching category may be selected based on the computed distance.

For example, in a 2-dimensional space defined by "music" on one axis and "books" on the other, a first profile may be represented as a point at location ($music_1$, $books_1$) and a second profile may be represented as another point at location ($music_2$, $books_2$). The similarity (or lack thereof) may be measured as the distance between ($music_1$, $books_1$) and ($music_2$, $books_2$). As this distance decreases, the similarity between the two profiles increases, and a matching may be established when this distance is shorter than a predefined threshold, when this distance is minimized, or by any other such method known in the art.

Further, if one profile has more, less or different categories from another, the categories that both profiles share may be used to generate the n-dimensional space. Alternatively, the n-dimensional space may be generated with regard to one of the profiles and the other profile may be projected into that space. For example, if profile A has three categories, and profile B has only two, a three dimensional space may be generated wherein the profile A is represented by a point and profile B is represented by a line. As will be readily understood by one of ordinary skill in the art, other methods of construction n-dimensional representation of the profiles and determining their relative similarities are also possible without departing from the scope of the present invention.

At step 430, the itinerary cost values and the affinity cost values are combined for the stored profile 20 being compared to the search criteria 10. Combination of the itinerary and personal affinity cost values can include a direct sum of the values, an averaging of the values, a weighted average of the values, a sum of the square of the values, and the like. In the case of a weighted average, or any other weighting function, the weights associated therewith may be determined automatically in accordance with past rideshare history, or may be set by the user seeking a rideshare, or may be established within the stored profiles 20.

The results of the cost value generation may then be directly displayed together with their corresponding profiles, or may optionally be compared to a predetermined threshold at step 440, as discussed above. Alternatively, step 440 may be omitted, and all matching stored profiles 20 may be displayed with their corresponding cost values, a predefined number of profiles which most closely match the search criteria may be displayed, or results may be displayed according to a user-established rule.

At step 460, if the predetermined threshold is used, the system determines whether a profile's associated cost value is above or below the threshold. If the profile's cost value is not above the predetermined threshold, then the profile is stored in the display list at step 450, for display to the user. If, on the other hand, the profile's corresponding cost value is above the predetermined threshold, the system chooses the next stored profile at step 470 and returns to step 400 for processing of the other profiles 20 stored in the storage medium 50 until all stored profiles 20 have been compared to the search criteria 10.

Figure 5:
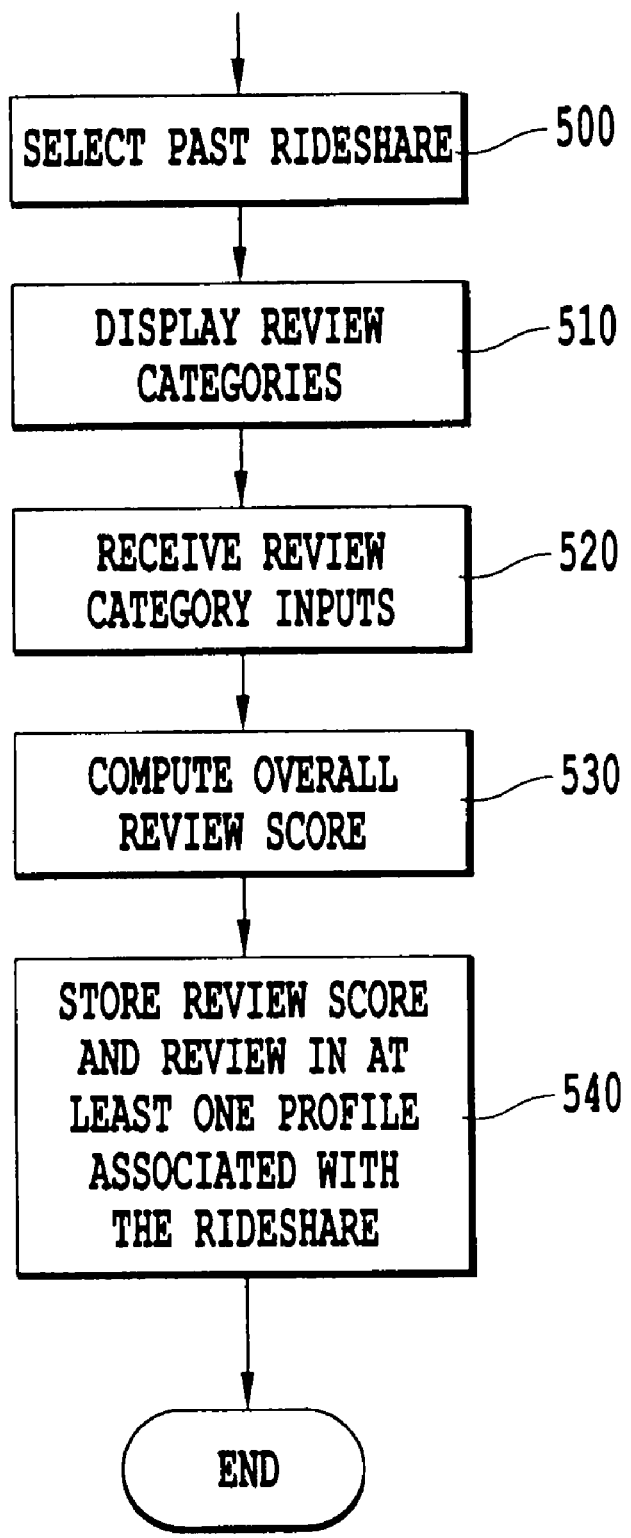
FIG. 5 is a flowchart of rideshare review according to an exemplary embodiment of the present invention.

As will be described later in detail, the stored profiles 20 may include a rating of the corresponding user by other users in accordance with past rideshares. FIG. 5 is a flowchart of user rating according to an exemplary embodiment of the present invention. At step 500 a user may select a past rideshare that he or she wants to rate. Then, at step 510, predetermined review categories are displayed to the user for rating. The predetermined review categories can include, without limitation, punctuality, courtesy, dependability, driver safety, car cleanliness, and the like. Further, data entry of each of the review categories may be through a short written answer, or by a numeric ranking. For example, a numeric ranking may include the numbers ranging from 1 to 10, wherein a ranking of 1 corresponds to a bad review while a ranking of 10 corresponds to an excellent review. Optionally, the user may be given an area in which to write general comments.

Inputs to each review category are received at step 520, and an overall review score is computed at step 530. The review score is stored in at least one of the profiles associated with the rideshare being reviewed at step 540.

In storing the review score, the review score may be stored by appending the score to a collection of review scores, by averaging the review score with a stored average review score, by replacing a stored review score with the new review score, or by any other means known in the art.

Moreover, the review score may be calculated as a direct sum, an average, a weighted average, a sum of squares, a median, and the like.

The ridesharing method described above has been described as a single user seeking a rideshare with a single driver. However, the present disclosure is not limited to establishing rideshares between two people, and may also be used to establish rideshares among any number of participants limited only by the number of passengers that can be safely accommodated in a driver's vehicle. As such, the rideshare system may also include determining a remaining capacity in a vehicle, determining cost values relative to multiple search criteria from multiple ride seekers, and the like.

Figure 6:
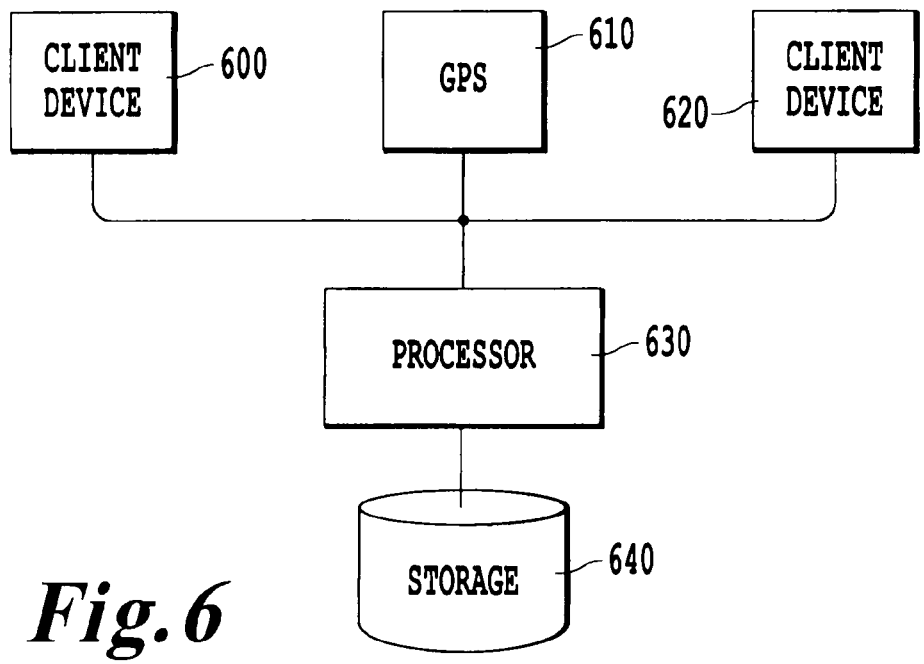
FIG. 6 is a schematic diagram of a rideshare recommendation system according to an exemplary embodiment of the present invention.

Next, a system for ridesharing recommendation according to an exemplary embodiment of the present invention is described with reference to FIG. 6. In FIG. 6, a user seeking a rideshare may enter the search criteria 10 on a computing device 600 or 620. For illustrative purposes only, and in no way limiting this disclosure, the computing device 620 corresponds to a user seeking a rideshare, and the computing device 600 corresponds to a user whose profile matches a search criteria. Also, though only two user devices are shown communicating with the rideshare recommendation system, one skilled in the art will appreciate that multiple users may communicate with the rideshare system simultaneously, and the rideshare system may generate multiple rideshare recommendations simultaneously.

The computing devices 600 and 620 may be any one of a mobile device, such as a cell phone, PDA, GPS, or a laptop computer, desktop computer, and the like. The computing devices may also allow a user to communicate with the rideshare system through an internet webpage, or may be modified to include a specialized user interface for use with the rideshare system.

For example, in the case of a GPS, the GPS may be modified to include an overlay showing the current position of any or all rideshare system users in the vicinity of a user seeking a rideshare. The overlay may allow a user to select any one of the displayed users in order to display their associated profiles, send a rideshare solicitation message, or the like.

Further, a dedicated rideshare interface as described above may be implemented as software instruction provided as a utility application, background daemon, component of an operating system, or any combination thereof executing in conjunction with a processor and an operating system such as Microsoft VISTA, Unix, Solaris, Linux, Apple MAC-OS and other systems known to those skilled in the art.

Alternatively, the rideshare interface used on the computing device 600 or 620 may be provided in hardware, such as an FPGA, CPLD, ASIC, or specialized microprocessor as can be appreciated by those skilled in the art.

The rideshare system may also include a rideshare processor 630, to which an electronic storage device 640 is connected for storing the stored profiles 20, and a GPS device 610 for receiving real-time user position information. Alternatively, the electronic storage device 640 and GPS device 610 may be integrated into the rideshare processor 630.

The components of the rideshare system of FIG. 6 may communicate via a wireless network, such as a cellular network or Wifi, or a wired network, such as PSTN phone networks, ISDN, LAN, WAN and the like.

Figure 7:
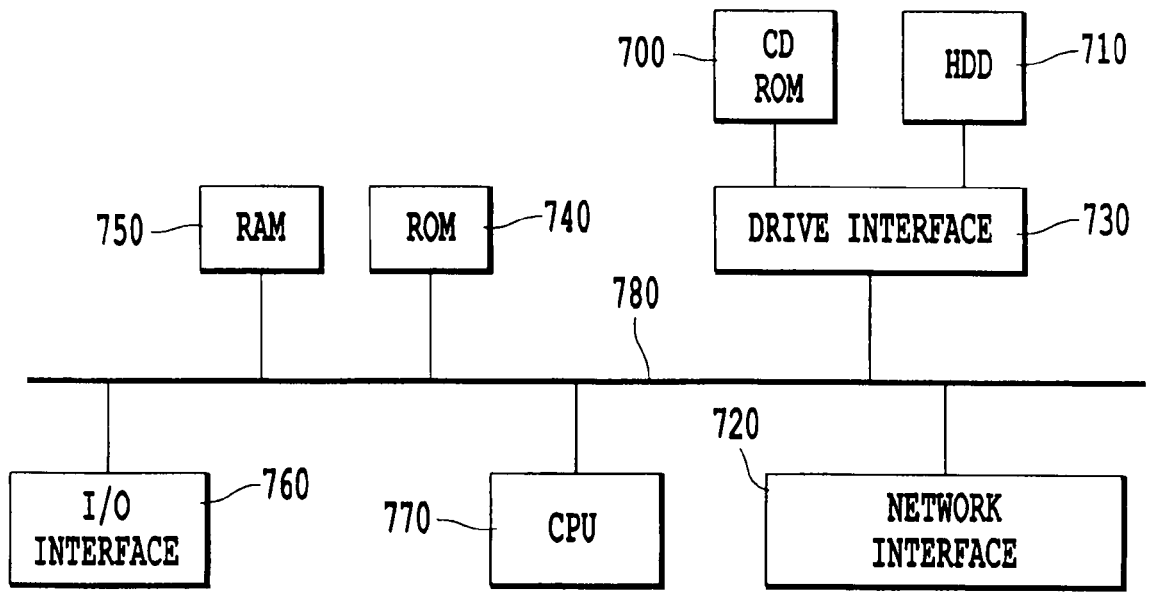
FIG. 7 is a schematic diagram of a processor for a rideshare system according to an exemplary embodiment of the present invention.

FIG. 7 is a schematic drawing of the rideshare processor 630 according to an exemplary embodiment of the present invention. The rideshare processor 630 includes a central processing unit (CPU) 770 for performing a ridesharing method as described above, a ROM memory 740, for storing the instructions corresponding to the above-described rideshare recommendation method, and a RAM memory 750 to store temporary information, such as search results, cost values, and the like. Further, the rideshare processor 630 includes a drive interface 730 for interfacing a CD-ROM drive 700, a DVD drive 790, a hard disk drive 710, and the like. A network interface 720 is used to interface with the wireless network, wired network, internet, etc. A general input/output interface 760 is used to interface with, for example, the GPS 610, but may also be used to interface with the electronic storage 640. A data bus 780 interconnects the components of the rideshare processor 630.

Alternatively, the rideshare system may be implemented on a personal computing device, such as a PC employing a processor. The instructions implementing the rideshare system may be provided as a utility application, background daemon, component of an operating system, or any combination thereof executing in conjunction with the processor and an operating system such as Microsoft VISTA, Unix, Solaris, Linux, Apple MAC-OS and other systems known to those skilled in the art.

Further, the rideshare recommendation system may also be implemented on hardware devices such as FGPAs, ASICs, microcontrollers, PLDs or other such devices known in the art.

A user seeking a rideshare may enter a search criteria 10 at the computing device 620, which will then transmit the search criteria 10 to rideshare processor 630 through the network. The rideshare processor 630 then uses the search criteria 10 to search the electronic storage device 640 for matching profiles, and returns a list of matching profiles to the computing device 620. Further, the rideshare processor 630 may use the GPS 610 to identify matching profiles in real-time according to current user positions.

The user may then select one of the returned profiles at the computing device 620, and the selection will be transmitted to the rideshare processor 630. The rideshare processor will generate an anonymous message and deliver the anonymous message to the mobile device 600, which corresponds to the user of the selected profile. The user of the selected profile may either accept or reject the rideshare request at the computing device 600, and the computing device 600 will transmit the result to the rideshare processor 630. The rideshare processor 630 will then either provide the computing device 620 with the contact information (i.e., e-mail address, phone number, or the like) corresponding to the computing device 600, or will transmit an anonymous denial message to the computing device 620. If the rideshare request is accepted by the user of the mobile device 600, the user of the mobile device 620 may then communicate directly with the user of the device 600 through the network.

Furthermore, while the rideshare system of FIG. 6 is a centralized system, a distributed system is also possible using a peer-to-peer network. For example, multiple rideshare processors 630 having multiple electronic storage devices 640 and GPS units 610 may be linked in a network. Alternatively, the rideshare processor 630 and electronic storage 640 may be eliminated and the corresponding functions may directly be performed by the computing devices 600 and 620. The rideshare system may also include a translator that translates among different communication protocols, allowing a wide variety of computing devices to be used with the system.

Figure 8:
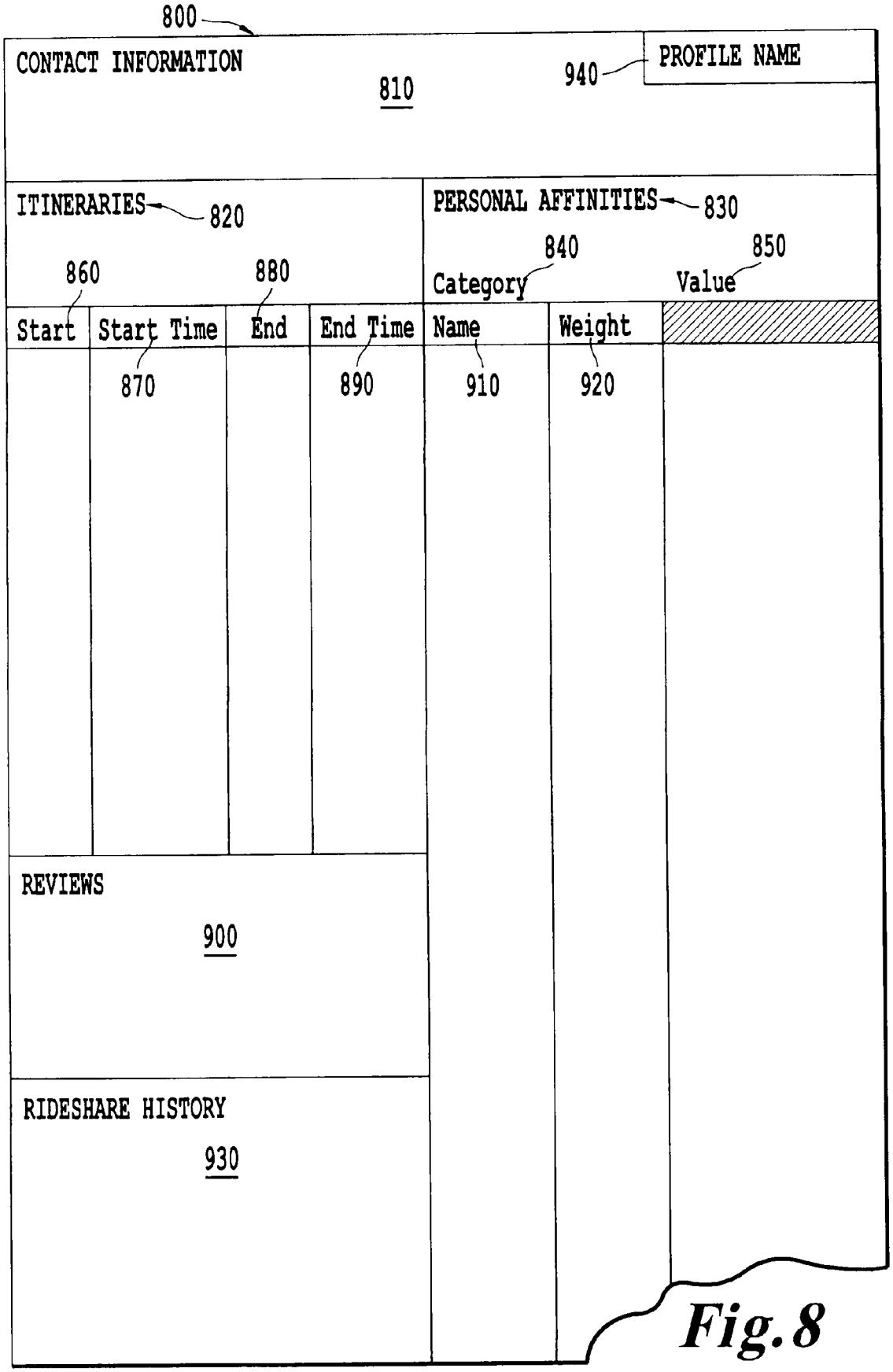
FIG. 8 is an personal profile format according to an exemplary embodiment of the present invention.

Next, a sample personal profile will be described with reference to FIG. 8. FIG. 8 is a schematic drawing of a sample user profile according to an exemplary embodiment of the present invention. As can be appreciated by a person skilled in the art, the sample personal profile of FIG. 8 is only one of many possible variations of personal profiles that can be used with the rideshare recommendation method and system, and therefore in no way limits the present disclosure.

The personal profile 800 includes contact information 810, itineraries 820, personal affinities 830, reviews 900, rideshare history 930, and a profile name 940. The profile name 940 is used to distinguish between stored personal profiles, both for different users, as well as for a single user having multiple personal profiles. The contact information 810 may include, for example, phone numbers, addresses, e-mail addresses, URLs, and the like. Further, a user may designate the contact information 810 as "private" thereby limiting access to the contact information 810 only to those users with which a rideshare has been established.

The personal profile 800 is divided into two broad categories: itineraries 820 and personal affinities 830. The travel itineraries of the user are stored under itineraries 820. In this context, a travel itinerary information may include, without limitation, departure point, departure time, destination, intended route, and optionally intermediate waypoints. For example, commonly used itineraries may be a trip to work, trips to a doctor, trips to a grocery store, and the like. The itineraries 820 may also include other infrequently used itineraries, such as vacation trips, extended travel, short term trips, quick trips, and the like. The itineraries 820 are further divided into a departure point 860, a start time 870, a destination 880 and an end time or predicted arrival time 890. Though not shown in the itineraries 820 section, itineraries 820 may also include intermediate waypoints that further define the route.

The second broad category of the personal profile 800 is the personal affinities 830 category. As used herein, personal affinities include, without limitation, a person's interests, hobbies, preferences and the like. For example, personal affinities may include movie genres, book titles, smoking/non-smoking, favorite sports, etc. Personal affinities 830 are sub-divided into a category 840 and a value 850. The category 840 includes the name of the personal affinity, for example "movie genre". Optionally, the category 840 may also include a weight value 920 used in computing the personal affinity cost values, as described above. For each personal affinity category 840, a corresponding personal affinity value or values 850 are stored. For example, a personal affinity category 840 of "movie genre" may have a corresponding value 850 of "comedies".

Further, the personal profile 800 also stores reviews 900 that are computed as discussed above, as well as a rideshare history 930 reflecting past rideshares in which the user has participated.

Personal profiles 800 may be manually entered by a user, or imported from other systems that employ user profiles, such as Facebook, MySpace, and the like. A user may also enter a personal profile 800 in varying degrees of detail. For example, a user may opt to fill in numerous itineraries 820, numerous personal affinities 830, or a user may simply begin a personal profile 800 by entering a profile name 940 and a single itinerary 820. Of course, the user will also need to enter contact information 810. However, the user may allow the system to automatically populate the remaining categories of his or her personal profile 800 as he or she develops a rideshare history 930. Though such a method may reduce the amount of initial input by the user, it may also lead to inaccurate results until the personal profile 800 of the user is sufficiently populated to accurately reflect the user's personal affinities and itineraries.

In an alternative embodiment, profile data may be stored within an associative database structure to minimize data duplication and improve search flexibility. In this structure, a plurality of dictionaries may be defined, each corresponding to a category (and/or subcategory) of profile data. For example, dictionaries may be defined for contact information 810, personal affinities 830, itineraries 820, reviews 900 and rideshare histories 930. Dictionaries may also be defined for subcategories, such as name 910 and weight 920, which correspond to personal affinities 830. In this context, a dictionary includes a database, text file, spreadsheet, or any other computer file known in the art. Moreover, the dictionaries may be stored on hard disk drives, FLASH memory, ROM memory, EEPROM, Digital Versatile Disk (DVD), CD-ROM, or any other storage media known in the art. Each dictionary may be stored independently of the others, or several dictionaries may be stored in a single device, such as a server computer.

The personal profiles in the associative database system store associations linking data from one dictionary to data stored in another dictionary. The data itself is stored in the above-described dictionaries rather than in the personal profile. As such, the amount of data duplication is minimized, while search efficiency and flexibility is increased. As one skilled in the art will readily appreciate, the above-described associative database structure is merely exemplary, and other associative database structures are possible without departing from the scope of the present invention.

As recognized by the present inventors, a rideshare system as herein described more closely matches a prospective rider and a prospective driver, leading to a more pleasant ridesharing experience. As a result, the likelihood of repeat ridesharing is increased.

Moreover, the GPS 610 allows the rideshare system to locate prospective drivers and/or riders in real time, making "just in time" ridesharing possible. Also, though the rideshare system is described as using a GPS system to gather current position information of its users, other ways of gathering current positional information are also possible. For example, positional information may be gathered by triangulating signals from cell towers, or by identifying a cellular node or Wifi node through which the user is communicating, or any method known in the art.

Further, the rideshare system may also implement a credit/debit compensation system for rideshares. For example, each user maybe be allotted a predetermined amount of credits or the user may select his or her amount of credits through payment, or any other means of establishing credit known in the art. Then, the system may transfer credit to a driver, from a rider, in exchange for the rideshare. The amount transferred may be proportional to the distance traveled, time duration of the trip, time of day the trip is taken, advance notice and the like. Such a credit/debit compensation system may for example include a cap and trade system as known in the art.

Alternatively, a driver may require a passenger in order to use an "carpool lane." In this case the driver may transfer credits to the passenger's account in exchange for the passenger's agreement to ride with the driver. Third parties may also provide credits to the driver and/or rider as incentives to rideshare, or drivers/riders may provide credits to third parties in exchange for use of restricted travel lanes, traveling at peak travel times, etc. Other rideshare compensation schemes are also possible, as will be appreciated by one skilled in the art.

Several flowcharts are used in the above description. However, any processes descriptions or blocks in the flowcharts should be understood as representing modules, segments, portions of code which include one or more executable instructions for implementing the specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

Moreover, the foregoing discussion discloses merely exemplary embodiments of the present invention. As will be understood by those skilled in the art, the present invention may be embodied in other specific forms without departing from the spirit or essential characteristics thereof Accordingly, the disclosure of the present invention is intended to be illustrative, but not limiting of the scope of the invention, as well as other claims. The disclosure, including any readily discernable variants of the teachings herein, define, in part, the scope of the foregoing terminology such that no inventive subject matter is dedicated to the public.

The invention claimed is:

1. A method of causing a computer system to recommend a rideshare, comprising:
   generating, in a data processor, a search criteria according to user-defined inputs including at least one itinerary and at least one personal affinity category,
   storing a plurality of user profiles in a memory associated with the data processor, generating, in the data processor, a cost value for each of the plurality of stored user profiles according to the search criteria, each stored user profile including at least one itinerary and one personal affinity category, displaying anonymously at least one of the stored user profiles and a corresponding cost value on a display device, transmitting a first anonymous message to a communication address corresponding to a selected user profile, the anonymous message requesting a rideshare, receiving a second anonymous message from the communication address corresponding to the selected user profile, the second anonymous message indicating one of acceptance or rejection of the rideshare; and displaying, on the display device, a rideshare finalizing information upon receipt of an acceptance or an anonymous denial message upon receipt of a rejection, the at least one itinerary and the at least one personal affinity category of the search criteria being weighted to generate the cost values according to a plurality of user-defined priorities;

updating, in the data processor, a user profile according to at least one other profile corresponding to a history of past rideshare acceptances by identifying other user profiles, stored in the memory, corresponding to a rideshare history of the user profile, determining, in the data processor, matching personal affinity categories between the other user profiles and the user profile, updating, in the user profile, values corresponding to the matching personal affinity categories according to the other user profiles, and updating, in the user profile, at least one itinerary according to itineraries corresponding to the other user profiles, wherein for each matching personal affinity category corresponding values are copied from other user profiles to the user profile.

2. The method of causing a computer system to recommend a rideshare according to claim 1, further comprising:
comparing, in the data processor, the generated cost values corresponding to the stored user profiles to a predetermined threshold,
wherein only stored user profiles having a cost value below the predetermined threshold are displayed.

3. The method of causing a computer system to recommend a rideshare according to claim 1, wherein updating the user profile also includes adding at least one of a new personal affinity category and a new itinerary.

4. The method of causing a computer system to recommend a rideshare according to claim 1, wherein the generating a cost value step further includes:
computing, in the data processor, an itinerary cost value by determining a detour required to establish the rideshare between an itinerary in a stored profile and the itinerary in the search criteria;
weighting the computed itinerary cost according to the user-defined priorities;
identifying at least one matching personal affinity category between the search criteria and the stored profile;
computing, for every matching personal affinity category, a personal affinity cost corresponding to a relative distance between values corresponding to the search criteria and values corresponding to the stored profile;
weighting the personal affinity costs according to the user-defined priorities; and combining, in the data processor, the itinerary cost and personal affinity costs to generate the cost value.

5. The method of causing a computer system to recommend a rideshare according to claim 4, wherein the detour is determined relative to an overall distance traveled.

6. The method of causing a computer system to recommend a rideshare according to claim 4, wherein the detour is determined as an absolute distance value.

7. The method of causing a computer system to recommend a rideshare according to claim 4, wherein the detour is determined as an amount of time.

8. The method of causing a computer system to recommend a rideshare according to claim 4, wherein the detour is determined as a relative amount of time.

9. The method of causing a computer system to recommend a rideshare according to claim 1, further comprising:
receiving a review of a past rideshare; and
appending the review of the past rideshare to at least one of the stored profiles associated with the past rideshare.

10. The method of causing a computer system to recommend a rideshare according to claim 9, wherein the review of a past rideshare includes reviewing at least one of punctuality, dependability and safety.

11. The method of causing a computer system to recommend a rideshare according to claim 1, further comprising:
determining a user current position using a real-time user localization source; and
overlaying the user current position on an electronic map display.

12. The method of recommending a rideshare according to claim 1, further comprising:
exchanging, between at least two of a credit account of a rider, a credit account of a driver and a third-party credit account, a credit corresponding to a rideshare in which the driver and the rider participated.

13. The method according to claim 1, wherein when the rideshare finalizing information is displayed, the rideshare finalizing information includes contact information corresponding to the selected user profile.

14. The method according to claim 1, wherein when the rideshare finalizing information is displayed, the rideshare finalizing information includes a predetermined meeting location and time.

15. The method of causing a computer system to recommend a rideshare according to claim 1, wherein the updating further includes deleting, from the user profile, a personal affinity category.

16. A system for recommending a rideshare, comprising:
an electronic storage device configured to store a plurality of user profiles;
a receiver configured to receive a search criteria including at least one itinerary and at least one personal affinity category identifying at least one personal user interest, the at least one itinerary and at least one personal affinity category being weighted according to user-defined priorities;
a processor configured to generate a cost value for each of the plurality of user profiles stored in the electronic storage device, and configured to determine a display list of user profiles and corresponding cost values;
a transmitter configured to transmit the user profiles corresponding to the display list over a communications network,
wherein the transmitter sends an anonymous message requesting a rideshare to a communications address of a selected profile, and transmits one of an anonymous denial message in response to a rideshare rejection or a rideshare finalizing information, including at least one of a phone number and an email address, in response to a rideshare acceptance, and wherein the processor is further configured to update a user profile according to at least one other profile corresponding to a history of past rideshare acceptances by
identifying other user profiles, stored in the electronic storage device, corresponding to a rideshare history of the user profile,
determining, in the processor, matching personal affinity categories between the other user profiles and the user profile,
updating, in the user profile, values corresponding to the matching personal affinity categories according to the other user profiles, and
updating, in the user profile, at least one itinerary according to itineraries corresponding to the other user profiles, wherein for each matching personal affinity category corresponding values are copied from other user profiles to the user profile.

17. The system for recommending a rideshare according to claim 16, wherein the processor is further configured to compare the generated cost values corresponding to the stored user profiles to a predetermined threshold, and only the stored user profiles having a cost value below the predetermined threshold are displayed.

18. The system for recommending a rideshare according to claim 16, further comprising:
a real-time user localization unit configured to receive a current position of a user,
wherein the transmitter is further configured to transmit a graphical interface including an electronic map showing the current position of the user.

19. The system for recommending a rideshare according to claim 18, wherein the electronic map also displays a current capacity of a user corresponding to the current position.

20. The system for recommending a rideshare according to claim 19, wherein the processor is configured to account for a user travel direction and speed in computing the cost value.

21. The system according to claim 16, wherein when the rideshare finalizing information is displayed, the rideshare finalizing information includes contact information corresponding to the selected user profile.

22. The system according to claim 16, wherein when the rideshare finalizing information is displayed, the rideshare finalizing information includes a predetermined meeting location and time.

23. The method of causing a computer system to recommend a rideshare, according to claim 1, wherein the user interest includes at least one of books, movies, sports and hobbies.

24. A non-transitory computer-readable medium storing computer-readable instructions thereon, the computer readable instructions when executed by a computer cause the computer to perform a method for rideshare recommendation, comprising:
generating a search criteria according to user-defined inputs including at least one itinerary and at least one personal affinity category identifying at least one personal user interest, the personal affinity category being separate from the at least one itinerary;
generating a cost value for each of a plurality of stored user profiles according to the search criteria, each stored user profile including at least one itinerary and one personal affinity category;
displaying anonymously at least one of the stored user profiles and a corresponding cost value on a display;
transmitting a first anonymous message to a communication address corresponding to a selected user profile, the anonymous message requesting a rideshare;
receiving a second anonymous message from the communication address corresponding to the selected user profile, the second anonymous message indicating one of acceptance or rejection of the rideshare;
displaying one of a contact information, including at least a phone number or an email address, included in the selected user profile upon receipt of an acceptance and an anonymous denial message upon receipt of a rejection, wherein the at least one itinerary and the at least one personal affinity category of the search criteria are weighted to generate the cost values according to a plurality of user-defined priorities; and
updating a user profile according to at least one other profile corresponding to a history of past rideshare acceptances by
identifying other user profiles corresponding to a rideshare history of the user profile,
determining matching personal affinity categories between the other user profiles and the user profile,
updating values corresponding to the matching personal affinity categories according to the other user profiles, and
updating at least one itinerary according to itineraries corresponding to the other user profiles, wherein for each matching personal affinity category corresponding values are copied from other user profiles to the user profile.

25. The non-transitory computer-readable medium according to claim 24, further comprising:
comparing the generated cost values corresponding to the stored user profiles to a predetermined threshold,
wherein only the stored user profiles having a cost value below the predetermined threshold are displayed.

26. The non-transitory computer-readable medium according to claim 24, wherein the generating a cost value step further includes:
computing an itinerary cost value by determining a detour required to establish the rideshare between an itinerary in a stored profile and the itinerary in the search criteria;
weighting the computed itinerary cost according to the user-defined priorities;
identifying at least one matching personal affinity category between the search criteria and the stored profile;
computing, for every matching personal affinity category, a personal affinity cost corresponding to a relative distance between values corresponding to the search criteria and values corresponding to the stored profile;
weighting the personal affinity costs according to the user-defined priorities; and
combining the itinerary cost and personal affinity costs to generate the cost value.

27. The non-transitory computer-readable medium according to claim 24, wherein updating the user profile also includes adding at least one of a new personal affinity category and a new itinerary.

28. The non-transitory computer-readable medium according to claim 24, further comprising:
receiving a review of a past rideshare; and
appending the review of the past rideshare to at least one of the stored profiles associated with the past rideshare.

29. The non-transitory computer-readable medium according to claim 24, further comprising:
exchanging, between at least two of a credit account of a rider, a credit account of a driver and a third-party credit account, a credit corresponding to a rideshare in which the driver and the rider participated.

* * * * *